(12) United States Patent  (10) Patent No.: US 9,405,523 B2
Choi et al.  (45) Date of Patent: Aug. 2, 2016

(54) AUTOMATED BUILD AND DEPLOY SYSTEM

(71) Applicant: Bank of America Corporation, Charlotte, NC (US)

(72) Inventors: Sarah O. Choi, Charlotte, NC (US); Scott Samuel Murray, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/071,308

(22) Filed: Nov. 4, 2013

(65) Prior Publication Data

US 2015/0128112 A1  May 7, 2015

(51) Int. Cl.
*G06F 9/445* (2006.01)
*G06F 9/44* (2006.01)

(52) U.S. Cl.
CPC .. *G06F 8/61* (2013.01); *G06F 8/20* (2013.01); *G06F 8/71* (2013.01)

(58) Field of Classification Search
CPC ............... G06F 8/20; G06F 8/22; G06F 8/24; G06F 8/36; G06F 8/60–8/77
USPC .................................................. 717/101–178
See application file for complete search history.

(56) References Cited

U.S. PATENT DOCUMENTS

| | | | |
|---|---|---|---|
| 7,065,740 B2 | 6/2006 | Westerinen et al. | |
| 7,069,541 B2 | 6/2006 | Dougherty et al. | |
| 7,210,143 B2 | 4/2007 | Or et al. | |
| 7,257,804 B2 * | 8/2007 | Baecker | G06F 8/20 714/E11.218 |
| 7,480,898 B2 * | 1/2009 | Batten | G06F 11/3672 714/E11.207 |
| 7,574,692 B2 * | 8/2009 | Herscu | G06F 9/44505 717/114 |
| 7,735,062 B2 * | 6/2010 | de Seabra e Melo et al. | 717/120 |
| 8,225,281 B1 * | 7/2012 | Hardinger et al. | 717/120 |
| 8,245,192 B1 * | 8/2012 | Chen | G06F 8/30 717/103 |
| 8,396,581 B2 * | 3/2013 | Arduini | G06Q 10/04 700/100 |
| 8,417,715 B1 * | 4/2013 | Bruckhaus | G06F 17/30994 705/26.1 |
| 8,438,532 B2 * | 5/2013 | Fox | G06F 8/36 717/100 |
| 8,458,690 B2 | 6/2013 | Zhang et al. | |
| 8,464,246 B2 | 6/2013 | Davies et al. | |
| 8,793,656 B2 * | 7/2014 | Huang | G06F 11/3688 717/124 |
| 8,819,617 B1 * | 8/2014 | Koenig | G06F 8/70 717/701 |
| 9,015,671 B2 * | 4/2015 | Johnson | G06F 11/3688 717/111 |

(Continued)

OTHER PUBLICATIONS

ETL Evolution for Real-Time Data Warehousing—Dr. Kamal Kakish—Georgia Gwinnett College Lawrenceville, GA 30043 USA; Dr. Theresa A. Kraft—School of Management University of Michigan—Flint, MI 48502USA—2012 Proceedings of the Conference on Information Systems Applied Research; New Orleans Louisiana, USA—2012 EDSIG.*

(Continued)

*Primary Examiner* — Francisco Aponte
(74) *Attorney, Agent, or Firm* — Michael A. Springs

(57) ABSTRACT

A system includes a memory and a processor communicatively coupled to the memory. The processor accesses a particular build schedule from one or more build schedules stored in the memory. The processor accesses, according to the particular build schedule, one or more artifacts and a label associated with the one or more artifacts stored in one or more data repositories. The label associated with the one or more artifacts corresponds to a particular software environment. The processor builds a software package using the one or more artifacts and deploys the software package to the software environment corresponding to the label of the one or more artifacts.

18 Claims, 4 Drawing Sheets

(56) References Cited

U.S. PATENT DOCUMENTS

| | | | |
|---|---|---|---|
| 2003/0182652 A1* | 9/2003 | Custodio | 717/122 |
| 2003/0229884 A1* | 12/2003 | Carr et al. | 717/101 |
| 2004/0073889 A1* | 4/2004 | Baecker | G06F 11/3696 717/121 |
| 2006/0212857 A1* | 9/2006 | Neumann | G06F 8/20 717/140 |
| 2006/0218028 A1* | 9/2006 | Kelly et al. | 705/8 |
| 2007/0067175 A1* | 3/2007 | Fulgham et al. | 705/1 |
| 2007/0083850 A1* | 4/2007 | Kapoor et al. | 717/106 |
| 2007/0168919 A1 | 7/2007 | Henseler et al. | |
| 2009/0043778 A1* | 2/2009 | Jambunathan et al. | 707/10 |
| 2009/0125553 A1* | 5/2009 | Dickinson | 707/104.1 |
| 2010/0125840 A1 | 5/2010 | Schneider | |
| 2011/0107299 A1* | 5/2011 | Dehaan | 717/121 |
| 2011/0154314 A1* | 6/2011 | Balasubramanian | G06F 8/65 717/171 |
| 2011/0185339 A1* | 7/2011 | Andrade et al. | 717/104 |
| 2011/0209140 A1 | 8/2011 | Scheidel et al. | |
| 2011/0276939 A1* | 11/2011 | Frankin | G06F 8/71 717/101 |
| 2011/0320399 A1* | 12/2011 | Ledwich | G06F 17/30563 707/602 |
| 2012/0110030 A1* | 5/2012 | Pomponio | G06F 8/36 707/805 |
| 2014/0040182 A1* | 2/2014 | Gilder | G06F 17/30578 707/602 |

OTHER PUBLICATIONS

Importance of Future Change Requests Frequency Analysis Factor for Solution Selection and Software Maintenance—Samir Omanovic, Emir Buza—Department for Computer Science and Informatics Faculty of Electrical Engineering in Sarajevo Zmaja od Bosne bb, Kampus Univerziteta; Bosnia and Herzegovina—Recent Advances in Information Science—Jun. 2013.*

* cited by examiner

AUTOMATED BUILD AND DEPLOY SYSTEM

TECHNICAL FIELD OF THE INVENTION

This invention relates generally to computing systems, and more particularly to an automated build and deploy system.

BACKGROUND

Many institutions generate and maintain vast amounts of data. As one example, an institution may generate and maintain data about their customers and their customers' accounts. To effectively leverage this data, many institutions utilize software. The needs of an institution or business may require modification of existing software or generation of new software. The modification or generation of new software is often done manually. Manually modifying or generating new software, however, is a time-consuming and often error-prone process.

SUMMARY

According to embodiments of the present disclosure, disadvantages and problems associated with building and deploying software may be reduced or eliminated.

In certain embodiments, an automated build and deploy system is disclosed. A system includes a memory and a processor communicatively coupled to the memory. The processor accesses a particular build schedule from one or more build schedules stored in the memory. The processor accesses, according to the particular build schedule, one or more artifacts and a label associated with the one or more artifacts stored in one or more data repositories. The label associated with the one or more artifacts corresponds to a particular software environment. The processor builds a software package using the one or more artifacts and deploys the software package to the software environment corresponding to the label of the one or more artifacts.

Certain embodiments of the disclosure may provide one or more advantages. An advantage of some embodiments may be that the build and deploy operations of the system are automated. Another advantage of some embodiments may be that building of the software package by the processor is less prone to error than traditional manual compilation of code. In some embodiments, the system for building and deploying software packages may be less time consuming than traditional manual compilation of code. In some embodiments, software packages may be deployed to software environments without requiring manual compilation of the code before deploying to each software environment.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Large financial institutions and other entities may employ software developers to help manage large amounts of customer data and to create and modify programs and tools for utilizing that data. As one example, a financial institution may want to implement a rewards program as part of its online banking service. The creation of new software or the modification of existing software to generate new functionalities such as a rewards program may require compilations of code to be deployed to one or more software environments such as development environments, testing environments, and production environments.

Often, migrating code to different software environments is a time-consuming process that requires a developer to manually compile the code. Manually compiling code is an error-prone process, potentially resulting in the wrong code being input to the wrong software environment. Thus, the manual approach to code compilation and deployment to various software environments can be both costly and time consuming.

Figure 1:
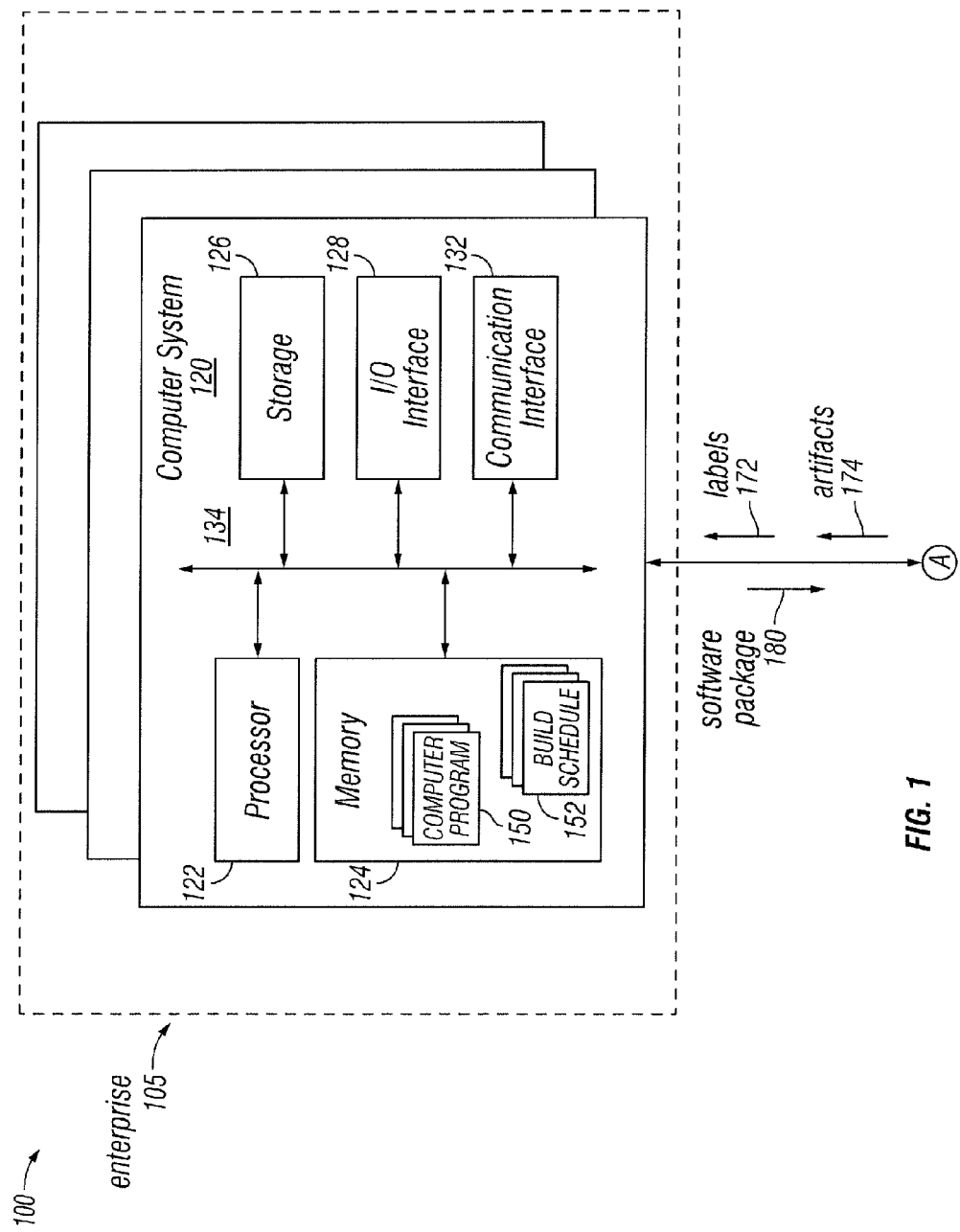
FIG. 1 illustrates a system for automatically building and deploying software packages, according to certain embodiments.
Figure 1:
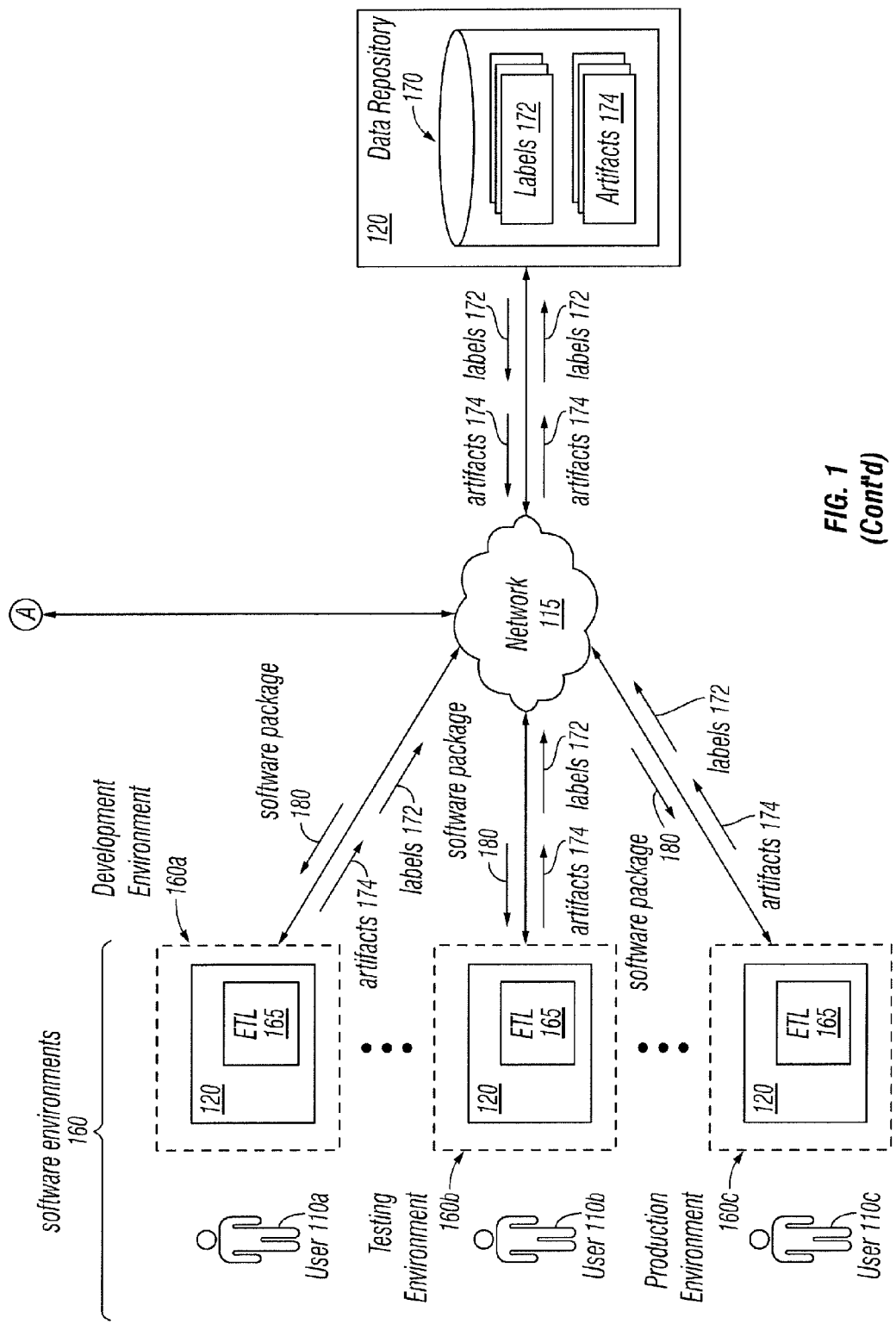
Figure 2:
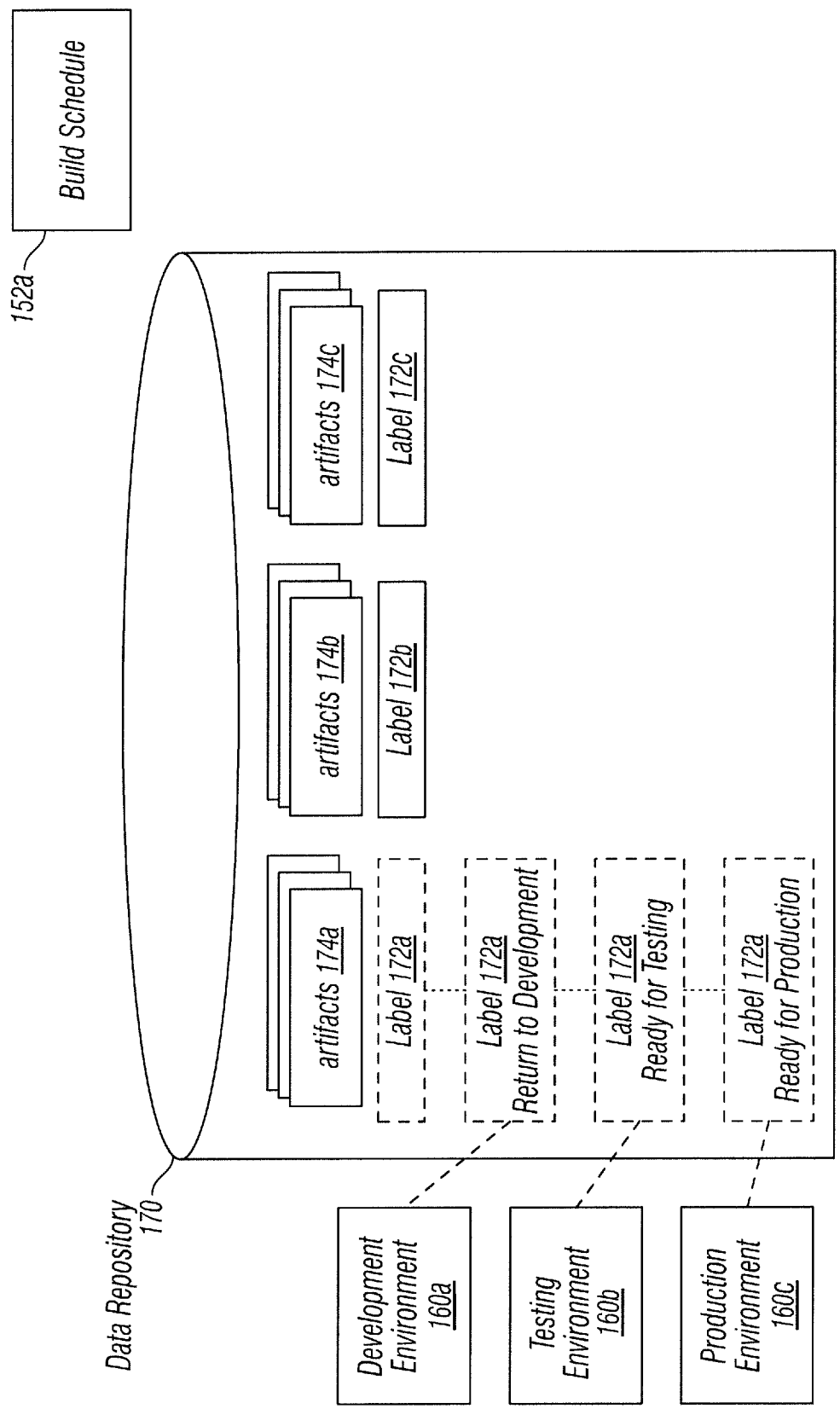
FIG. 2 illustrates an example data repository that may be utilized by the system of FIG. 1, according to certain embodiments.
Figure 3:
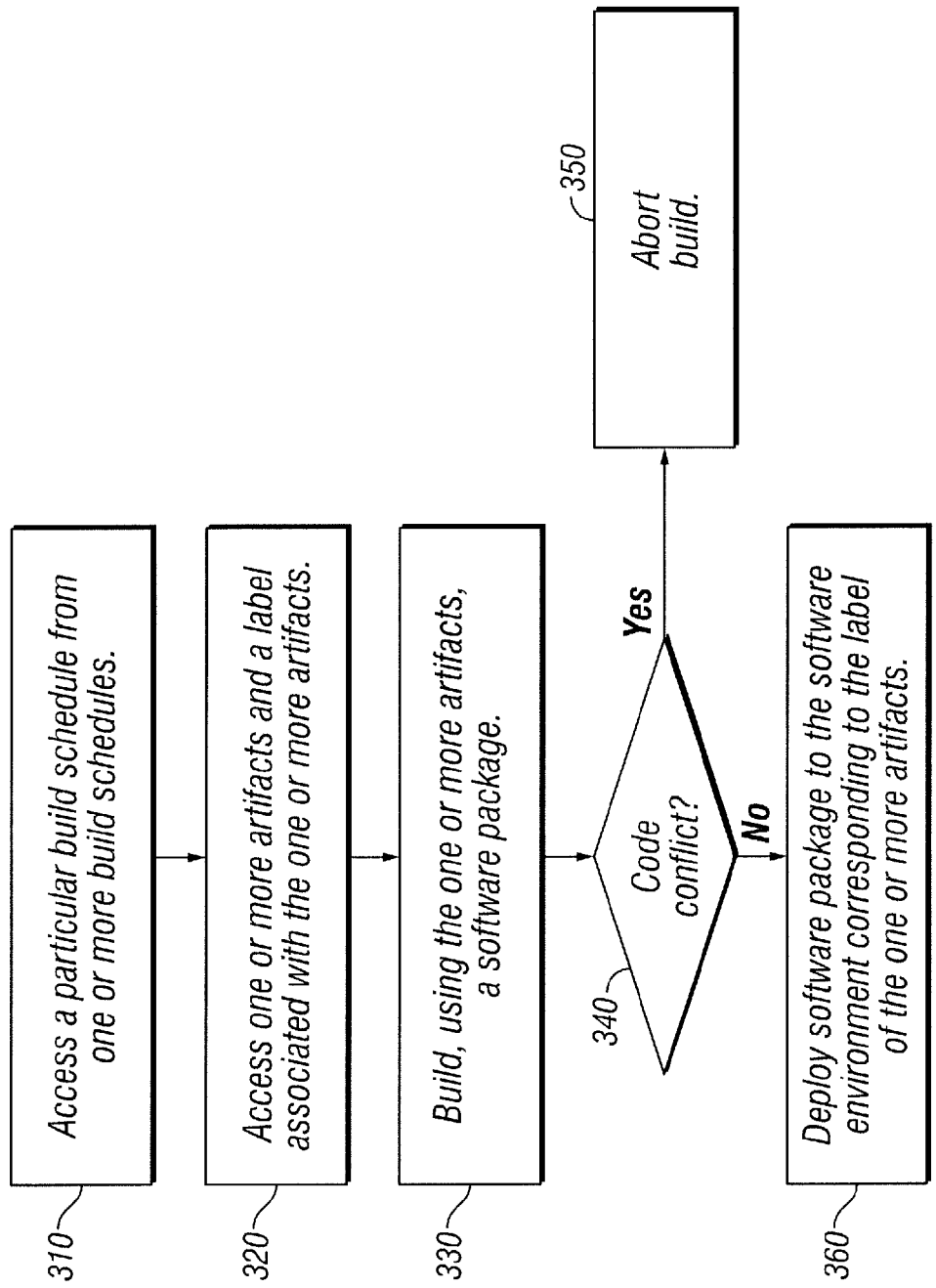
FIG. 3 illustrates a method for building and deploying software packages, according to certain embodiments.

The teachings of this disclosure recognize that it would be desirable to have a more efficient, less expensive and less time consuming system for compiling software packages and deploying them to various software environments. FIGS. 1 through 3 below illustrate an automated build and deploy system according to the teachings of the disclosure.

FIG. 1 illustrates a system 100 for automatically building and deploying software packages to different software environments, according to certain embodiments. System 100 includes an enterprise 105, one or more computer systems 120, one or more software environments 160, and one or more data repositories 170. Computer systems 120, software environments 160, and data repositories 170 may be communicatively coupled by one or more networks 115. In some embodiments, computer systems 120, software environments 160, and data repositories 170 may be directly communicatively coupled. System 100 is generally operable to automatically build and deploy software packages 180 to different software environments 160. One or more users 110 may be associated with system 100.

In general, an enterprise 105 may desire to modify an existing software program or create a new software program. For example, the enterprise 105 may wish to modify an existing piece of software to include a new functionality. Thus, one or more users 110 associated with enterprise 105 may need to access and modify the software so that the resulting program meets the needs of the enterprise 105. As an example, and not by way of limitation, to accomplish this task, a user 110 working in a particular software environment 160, such as development environment 160a, may desire to incorporate additional code into, or remove existing code from, an existing software package 180. Once the user 110 has made the desired modifications, the components of the modified software package (e.g., artifacts 174) may be labeled (e.g., with a label 172) and stored in a data repository 170. The user 110 may desire to deploy the modified software package to a different software environment 160 for testing. In one embodiment, the user 110 may create a build schedule 152 defining the interval with which computer system 120 will build the particular software package 180 and deploy it to a particular software environment 160, such as testing environment 160b.

In the testing environment, a user 110 may determine that additional changes need to be made to a software package and thus may return artifacts 174 and label 172 associated with artifacts 174 to data repository 170. Computer system 120 may subsequently build and deploy software package 180 back to the development environment 160a. Alternatively, the user 110 may determine that, after having examined software package 180 in testing environment 160b, software package 180 is ready to be deployed to a different software environment 160, such as production environment 160c. In particular embodiments, the artifacts 174 and label 172 associated with software package 180 may be returned to data repository 170 until the particular build schedule 152 instructs computer system 120 to build and deploy the software package 180 to production environment 160c.

In some embodiments, enterprise 105 may refer to a financial institution such as a bank. In certain embodiments, enterprise 105 may refer to any organization, entity, business, company, agency, and the like. In some embodiments, enterprise 105 may include one or more computer systems 120. Computer system 120 is described in more detail below.

In particular embodiments, user 110 is an individual employed by enterprise 105. In other embodiments, the user 110 may be a third party engaged by enterprise 105 to develop software packages 180. The present disclosure contemplates any suitable number of users 110 interacting with system 100 to generate software packages 180. A user 110 may operate in some, none, or all of the different software environments 160.

In certain embodiments, network 115 may refer to any interconnecting system capable of transmitting audio, video, signals, data, messages, or any combination of the preceding. Network 115 may include all or a portion of a public switched telephone network, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Computer systems 120 perform one or more steps of one or more methods described or illustrated herein. In particular embodiments, one or more computer systems 120 provide functionality described or illustrated herein. In particular embodiments, software running on one or more computer systems 120 performs one or more steps of one or more methods described or illustrated herein or provides functionality described or illustrated herein. Particular embodiments include one or more portions of one or more computer systems 120.

This disclosure contemplates any suitable number of computer systems 120. This disclosure contemplates computer system 120 taking any suitable physical form. As example and not by way of limitation, computer system 120 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, computer system 120 may include one or more computer systems 120; be unitary or distributed; span multiple locations; span multiple machines; or reside in a cloud, which may include one or more cloud components in one or more networks. Where appropriate, one or more computer systems 120 may perform without substantial spatial or temporal limitation one or more steps of one or more methods described or illustrated herein. As an example and not by way of limitation, one or more computer systems 120 may perform in real-time or in batch mode one or more steps of one or more methods described or illustrated herein. One or more computer systems 120 may perform at different times or at different locations one or more steps of one or more methods described or illustrated herein, where appropriate.

In some embodiments, computer system 120 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computer system 120 may be a web server running web server applications such as Apache, Microsoft's Internet Information Server™, and the like.

In particular embodiments, computer system 120 includes a processor 122, memory 124, storage device 126, an input/output (I/O) interface 128, a communication interface 132, and a bus 134. Although this disclosure describes and illustrates a particular computer system having a particular number of particular components in a particular arrangement, this disclosure contemplates any suitable computer system having any suitable number of any suitable components in any suitable arrangement.

In particular embodiments, processor 122 includes hardware for executing instructions, such as those making up a computer program 150. As an example and not by way of limitation, to execute instructions, processor 122 may retrieve (or fetch) the instructions from an internal register, an internal cache, memory 124, or storage device 126; decode and execute the instructions; and then write one or more results to an internal register, an internal cache, memory 124, or storage device 126. In particular embodiments, processor 122 may include one or more internal caches for data, instructions, or addresses. This disclosure contemplates processor 122 including any suitable number of any suitable internal caches, where appropriate. As an example and not by way of limitation, processor 122 may include one or more instruction caches, one or more data caches, and one or more translation lookaside buffers (TLBs). Instructions in the instruction caches may be copies of instructions in memory 124 or storage device 126, and the instruction caches may speed up retrieval of those instructions by processor 122. Data in the data caches may be copies of data in memory 124 or storage device 126 for instructions executing at processor 122 to operate on; the results of previous instructions executed at processor 122 for access by subsequent instructions executing at processor 122 or for writing to memory 124 or storage device 126; or other suitable data. The data caches may speed up read or write operations by processor 122. The TLBs may speed up virtual-address translation for processor 122. In particular embodiments, processor 122 may include one or more internal registers for data, instructions, or addresses. This disclosure contemplates processor 122 including any suitable number of any suitable internal registers, where appropriate. Where appropriate, processor 122 may include one or more arithmetic logic units (ALUs); be a multi-core processor; or include one or more processors 122. Although this disclosure describes and illustrates a particular processor, this disclosure contemplates any suitable processor.

In particular embodiments, memory 124 includes main memory for storing instructions such as computer program(s) 150 for processor 122 to execute, or data for processor 122 to operate on. As an example and not by way of limitation, computer system 120 may load instructions from storage device 126 or another source (e.g., another computer system 120) to memory 124. Processor 122 may then load the instructions from memory 124 to an internal register or internal cache. To execute the instructions, processor 122 may retrieve the instructions from the internal register or internal cache and decode them. During or after execution of the instructions, processor 122 may write one or more results (which may be intermediate or final results) to the internal register or internal cache. Processor 122 may then write one or more of those results to memory 124. In particular embodiments, processor 122 executes only instructions in one or more internal registers or internal caches or in memory 124 (as opposed to storage device 126 or elsewhere) and operates only on data in one or more internal registers or internal caches or in memory 124 (as opposed to storage device 126 or elsewhere). One or more memory buses (which may each include an address bus and a data bus) may couple processor 122 to memory 124. Bus 134 may include one or more memory buses, as described below. In particular embodiments, one or more memory management units (MMUs) reside between processor 122 and memory 124 and facilitate accesses to memory 124 requested by processor 122.

In certain embodiments, instructions executed by processor 122 may reside in one or more computer programs 150. Computer program 150 generally refers to instructions, logic, rules, algorithms, code, tables, or other suitable instructions for performing the described functions and operations. In some embodiments, computer program 150 may be stored in memory 124, storage device 126, or any other location accessible to computer system 120. Where appropriate, computer program 150 may include one or more computer programs 150; be unitary or distributed; span multiple locations; span multiple machines; or reside in a cloud.

In particular embodiments, storage device 126 includes mass storage for data or instructions such as computer program 150. As an example and not by way of limitation, storage device 126 may include an HDD, a floppy disk drive, flash memory, an optical disc, a magneto-optical disc, magnetic tape, a Universal Serial Bus (USB) drive, a solid-state drive (SSD), or a combination of two or more of these. Storage device 126 may include removable or non-removable (or fixed) media, where appropriate. Storage device 126 may be internal or external to computer system 120, where appropriate. In particular embodiments, storage device 126 is non-volatile, solid-state memory. In particular embodiments, storage device 126 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage device 126 taking any suitable physical form. Storage device 126 may include one or more storage control units facilitating communication between processor 122 and storage device 126, where appropriate. Where appropriate, storage device 126 may include one or more storage devices 126. Although this disclosure describes and illustrates particular storage, this disclosure contemplates any suitable storage.

In particular embodiments, I/O interface 128 includes hardware, software, or both providing one or more interfaces for communication between computer system 120 and one or more I/O devices. System 100 may include one or more of these I/O devices, where appropriate. One or more of these I/O devices may enable communication between a person and computer system 120. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 128 for them. Where appropriate, I/O interface 128 may include one or more devices or software drivers enabling processor 122 to drive one or more of these I/O devices. I/O interface 128 may include one or more I/O interfaces 128, where appropriate. Although this disclosure describes and illustrates a particular I/O interface, this disclosure contemplates any suitable I/O interface.

In particular embodiments, communication interface 132 includes hardware, software, or both providing one or more interfaces for communication (e.g., packet-based communication and facsimile communication) between computer system 120 and one or more other computer systems 120, one or more networks such as network 120, exchange hub 130, and one or more entities 135. As an example and not by way of limitation, communication interface 132 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 132 for it. As an example and not by way of limitation, computer system 120 may communicate with an ad hoc network, a personal area network (PAN), a local area network (LAN), a wide area network (WAN), a metropolitan area network (MAN), one or more portions of the Internet, a PSTN, or a combination of two or more of these. One or more portions of one or more of these networks may be wired or wireless. As an example, computer system 120 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 120 may include any suitable communication interface 132 for any of these networks, where appropriate. Communication interface 132 may include one or more communication interfaces 132, where appropriate. Although this disclosure describes and illustrates a particular communication interface, this disclosure contemplates any suitable communication interface.

In particular embodiments, bus 134 includes hardware, software, or both coupling components of computer system 120 to each other. As an example and not by way of limitation, bus 134 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 134 may include one or more buses 134, where appropriate. Although this disclosure describes and illustrates a particular bus, this disclosure contemplates any suitable bus or interconnect.

In particular embodiments, memory 124 may contain one or more build schedules 152. Build schedules 152 may contain information regarding the frequency with which the processor 122 accesses labels 172 and artifacts 174 from the one or more data repositories 170. As an example, and not by way of limitation, a particular build schedule 152 may indicate that processor 122 will access the labels 172 and artifacts 174 six times per day. Another build schedule 152, for example, may indicate that processor 122 will access the labels 172 and artifacts 174 four times per day. In some embodiments, build schedules 152 may be associated with labels 172. In some embodiments, build schedules 152 may be associated with one or more software environments 160.

In particular embodiments, build schedules 152 may be dynamically updated. In some embodiments, a user 110 may update build schedules 152. In other embodiments, computer system 120 may update build schedules 152. In some embodiments, build schedules 152 may be updated to change the software environment 160 with which a particular build schedule 152 is associated. In some embodiments, build schedules 152 may be updated to adjust the frequency with which computer system 120 accesses the associated labels 172 and artifacts 174 from the one or more data repositories 170. In other embodiments, build schedules 152 may be fixed.

In particular embodiments, system 100 may contain one or more software environments 160. In general, a software environment 160 is a region having a particular set of characteristics. These characteristics may make it suitable to perform a particular function in a particular software environment 160, such as development or testing. Software environments 160 may contain one or more computer systems 120. Software environments 160 also may contain an extract, transform, and load (ETL) platform 165. This disclosure contemplates the use of any suitable ETL platform 165, such as the IBM Infosphere Datastage. Although FIG. 1 illustrates three software environments 160a, 160b, and 160c, the present disclosure contemplates any suitable number of software environments 160. In addition, software environments 160 may be separate from enterprise 105, as illustrated, or may be included within enterprise 105.

The various software environments 160 may utilize different infrastructures, or operate different versions of one or more pieces of software. In certain embodiments, one or more of the plurality of software environments 160 may be designed to perform specific functions within system 100. As an example, and not by way of limitation, software environment 160a may be a development environment, in which the software components used to build software packages 180 are developed; software environment 160b may be a testing environment, in which the software package 180 is evaluated to determine, for example its compatibility across different versions of systems, or, in other embodiments, whether the software package 180 can actually accomplish its intended function; and software environment 160c may be a production environment, where software packages 180 that have been successfully developed and tested are formally put into operation, for example on enterprise 105's website. Software environments 160 may receive one or more software packages 180 over network 115.

In certain embodiments, software environments 160 may have one or more users 110 associated with them. As one example, and not by way of limitation, a particular user 110a may interact with development environment 160a, while another user 110b may interact with testing environment 160b. Alternatively, the same user 110 may interact with all, some, or one of the software environments 160. In certain embodiments, implementation of system 100 may not require a user 110 associated with the one or more software environments 160.

In certain embodiments, system 100 may include an ETL platform 165. ETL platform 165 may be included within the one or more software environments 160. In some embodiments, ETL platform 165 is any code generating product. ETL platform 165 may generate artifacts 174, discussed in more detail below. In some embodiments, ETL platform 165 may be an integrated development environment. ETL platform 165 may contain a graphical user interface. In particular embodiments, ETL platform 165 may have drag and drop functionality for generating code. The present disclosure contemplates the use of any suitable ETL platform, such as the IBM Infosphere Datastage.

In particular embodiments, system 100 may contain one or more data repositories 170. In certain embodiments, data repositories 170 may store labels 172 and artifacts 174, discussed in more detail below. In certain embodiments, the one or more data repositories 170 may store information in addition to labels 172 and artifacts 174. In addition to storing labels 172 and artifacts 174, the one or more data repositories 170 may include version control functionality. In certain embodiments, the one or more data repositories 170 may be included with enterprise 105. Data repository 170 may be any suitable data repository, such as, for example and not by way of limitation, an IBM Rational ClearCase data repository. A particular embodiment of data repository 170 is illustrated below in reference to FIG. 2.

In particular embodiments, the one or more data repositories 170 may store labels 172. In certain embodiments, labels 172 may be associated with one or more artifacts 174. Labels 172 may also correspond to a particular software environment 160. Labels 172 may also correspond to a particular build schedule 152. In certain embodiments, label 172 may be modified. Label 172 may be modified so that label 172 corresponds to a different software environment 160, or to a different build schedule 152. The artifacts 174 associated with label 172 may be modified as well. In conjunction with this, labels 172 may be updated to reflect the latest software environment 160 corresponding to a particular label 172. Labels 172 may be generated by a user 110 to associate certain artifacts 174 with a particular build schedule 152 or software environment 160. Alternatively, in other embodiments, computer system 120 may generate labels 172 to associate certain artifacts 174 with a particular build schedule 152 or software environment 160.

In particular embodiments, the one or more data repositories 170 may store artifacts 174. In general, artifacts 174 may be any software component, such as IBM Datastage components, executable files, or any other configurable item. In certain embodiments, artifacts 174 may be generated by ETL platform 165, as discussed above. As an example, and not by way of limitation, artifacts 174 may consist of software code conferring a particular functionality to a program. As another example, and not by way of limitation, artifacts 174 may include software components such as IBM Infosphere Datastage components. In particular embodiments, artifacts 174 may be assembled by processor 122 to form a software package 180, as discussed in detail below.

In general, a user 110 may generate one or more artifacts 174 to be combined into a software package 180 having particular attributes, such as a desired functionality. While working in a particular software environment 160, such as development environment 160a, user 110 may generate, using ETL platform 165, the one or more artifacts 174 necessary to build the appropriate software package 180 to achieve the desired functionality. Enterprise 105 may require that the newly generated software package 180 be tested in a different software environment 160, such as testing environment 160b. The artifacts 174 and labels 172 associated with the software package 180 are stored in one or more data repositories 170. According to a particular build schedule 152, discussed above, processor 122 of computer system 120 will access the one or more data repositories 170 and the artifacts 174 and labels 172 associated with the build schedule, and build software package 180 using artifacts 174. Computer system 120 will then deploy software package 180 to the testing environment 160*b*.

In general, processor 122 accesses the one or more data repositories according to a particular build schedule 152. In certain embodiments, labels 172 indicate to processor 122 which artifacts 174 are to be built into software package 180. In other embodiments, labels 172 may indicate to processor 122 that software package 180 should be deployed to a particular software environment 160.

In general, software package 180 is a compilation of code. Software package 180 may be generated to accomplish any suitable purpose. For example, enterprise 105 may use software package 180 to manage customer data in a particular way, or to allow customers to interact with enterprise 105 in a particular fashion. In order to create a software package 180 which meets the needs of enterprise 105, software package 180 may need to be deployed to one or more software environments 160.

In particular embodiments, software package 180 is built by processor 122 operating on computer system 120. In certain embodiments, software package 180 is built using artifacts 174. Software package 180 may be built and deployed according to a particular build schedule 152. According to the build schedule 152, software package 180 may be deployed over network 115 to one of a plurality of software environments 160. In certain embodiments, the process of building and deploying software package 180 is automated. As an example, and not by way of limitation, software package 180 may be deployed to testing environment 160*b*. Alternatively, software package 180 may be deployed to development environment 160*a*. Software package 180 may be sent to any number of software environments 160. In certain embodiments, software package 180 may contain other components instead of or in addition to artifacts 174. As an example, and not by way of limitation, software package 180 may contain an executable file. The present disclosure contemplates that multiple software packages 180 may be built at a given time using system 100.

Although not illustrated in FIG. 1, in particular embodiments processor 122 may also be operable to generate build summary reports. In certain embodiments, build summary reports may contain information about system 100 or one or more of the plurality of build schedules 152. As an example, and not by way of limitation, build summary reports may include information relating to the artifacts 174 used in the build or the status of deployment in each of the build's current software environments 160.

In operation, processor 122 operating on one or more computer systems 120 builds a software package 180 according to a particular build schedule 152 using labels 172 and artifacts 174. Processor 122 may deploy the software package 180 to one of the plurality of software environments 160. In one embodiment, a build schedule 152 in memory 124 is accessed by processor 122 to determine the frequency with which processor 122 is to access the one or more data repositories 170. As an example, and not by way of limitation, the build schedule 152 may indicate that the build frequency is six times per day. At the appropriate interval, the one or more data repositories 170 may be accessed by processor 122 over network 115. According to the particular build schedule 152, artifacts 174 and the label 172 associated with the label are accessed by processor 122.

Processor 122 builds, using label 172 and artifacts 174, a software package 180. Additional components may be included in the software package built by processor 122. For example, software package 180 may include an executable file. Optional build-in verification on any code conflict may be performed. If a code conflict exists, then the build is aborted and artifacts 174 and labels 172 are returned to data repository 170. If no code conflict is found during the build-in verification on any code conflict, or if build-in verification on any code conflict is not performed, software package 180 is deployed to one or more of the plurality of software environments 160 over network 115. In particular embodiments, backup may be performed on each deployment in one or more of the software environments 160, one or more of the data repositories 170, and one or more of the computer systems 120, so that restoration can be done if required.

Software environments 160 may then utilize software package 180 in any suitable number of ways. One or more users 110 may be associated with software environments 160 and may interact with software package 180 in one or more of the software environments 160. As an example, and not by way of limitation, software environments 160*a-c* may function in development, testing, or production capacities. In certain embodiments, users 110 may modify the label 172 and artifacts 174, and return software package 180 containing modified artifacts 174 and modified label 172 over network 115 to data repository 170. Based on the particular build schedule 152, processor 122 may access artifacts 174 and modified label 172 at a defined interval, building software package 180 and deploying software package 180 to a different one of the plurality of software environments 160 based on the modified label 172. In other embodiments, the label 172 may be modified without the input of user 110. For example, and not by way of limitation, processor 122 may modify label 172 based on the result of build-in verification on any code conflict.

To further illustrate the above example, and not to limit the disclosure, in one embodiment software package 180 may be assembled from artifacts 174 by processor 122 of computer system 120 and, based on the label 172, be deployed over network 115 to testing environment 160*b*. In certain embodiments, user 110*b*, while testing software package 180, may discover one or more issues with software package 180 requiring correction before the software package 180 may be implemented. In response, user 110*b* modifies the label 172 so that it is now associated with the development software environment 160*a*. Processor 122 may then return the artifacts 174 and modified label 172 of software package 180 to the one or more data repositories 170. Later, at a defined interval according to the particular build schedule 152, processor 122 will again build software package 180 using artifacts 174 and deploy software package 180 over network 115 to the software environment 160 corresponding to the modified label 172, in this case development environment 160*a*, where the earlier discovered issues may be corrected.

FIG. 2 illustrates one embodiment of data repository 170. Data repository 170 may store a plurality of artifacts 174, for example artifacts 174*a*, 174*b*, and 174*c*. Repository 170 may also store a plurality of labels 172, for example labels 172*a*, 172*b*, and 172*c*. In other embodiments, data repository 170 may store other information in addition to artifacts 174 and labels 172. In certain embodiments, data repository 170 may contain version control functionality. The present disclosure contemplates the use of any suitable number of suitable data repositories 170, such as, for example, an IBM Rational ClearCase data repository.

Each of the plurality of labels 172 may be associated with a particular group of one or more artifacts 174. As an example, and not by way of limitation, label 172a may be associated with one or more artifacts 174a; label 172b may be associated with one or more artifacts 174b; and label 172c may be associated with one or more artifacts 174c. Labels 172 may also correspond to a particular software environment 160. As an example, and not by way of limitation, label 172a may correspond to development environment 160a; label 172b may correspond to testing environment 160b; and label 173c may correspond to production environment 160c. Although this disclosure describes examples with certain numbers of labels 172, artifacts 174, and software environments 160, the disclosure contemplates embodiments containing any suitable number of labels 172, artifacts 174, and software environments 160.

As one example, and not by way of limitation, enterprise 105 may desire to create a new software package 180. In one embodiment, a user 110a working in development environment 160a may generate one or more artifacts 174a using ETL platform 165. Having generated the artifacts 174a that will be built into software package 180, user 110a may assign a label 172a to the artifacts 174a. The label 172a associated with artifacts 174a corresponds to a particular software environment 160. In certain embodiments, the label 172a may associate artifacts 174a with the particular project. While working on the project, user 110a may be interrupted. In such a case, computer system 120 stores the generated artifacts 174a, along with the associated label 172a, in data repository 170.

According to the particular build schedule 152, processor 122 operating on computer system 120 will, at defined intervals, build software package 180 using artifacts 174a and deploy software package 180 to the development environment 160a corresponding with label 172a. Alternatively, in some embodiments user 110a may instruct computer system 120 to build software package 180 and deploy software package 180 to development environment 160a. Working in the ETL platform 165 of development environment 160a, user 110a may make modifications to artifacts 174a of software package 180, or generate additional artifacts 174a to include in software package 180. User 110a may determine that software package 180 is ready to be tested. At this point, user 110a may modify the label 172a to reflect this. For example, user 110a may update label 172a to indicate that the particular project is "Ready for Testing." After updating, by user 110a, the label 172 may correspond to a different software environment 160, such as testing environment 160b. Computer system 120 then returns the updated label 172a and its associated artifacts 174a to data repository 170. According to build schedule 152, computer system 120 may automatically build software package 180 using the artifacts 174a associated with label 172a stored in data repository 170. Computer system 120 then deploys software package 180 over network 115 to the software environment 160 corresponding with updated label 172, in this example, testing environment 160b. Because label 172a may be associated with build schedule 152a, this process may occur at defined intervals.

Upon deploying software package 180 to testing environment 160b, another user, for example user 110b, may interact with software package 180 in testing environment 160b. In certain embodiments, testing environment 160b may allow software package 180 to be tested for compatibility with infrastructures of differing characteristics. Upon completing testing, computer system 120 may return label 172a and the associated artifacts 174a to data repository 170.

In some embodiments, label 172a may be further modified by user 110b. For example, label 172a may be modified based on the results of testing in testing environment 160b. If software package 180 did not perform as required while deployed in testing environment 160b, user 110b may modify label 172a to indicate that software package 180 "Return to Development." In this case, label 172a and associated artifacts 174a of software package 180 will be returned to data repository 170 with the updated information. Subsequently, according to the build schedule 152a associated with label 172a, computer system 120 may build software package 180 and deploy software package 180 to development environment 160a at defined intervals. In certain embodiments, a user 110a working in development environment 160a may instruct computer system 120 to build and deploy software package 180 to development environment 160a. Once deployed to development environment 160a, user 110a (or another user 110 associated with development environment 160a) may make modifications to the artifacts 174a associated with label 172a and software package 180.

Alternatively, if software package 180 performs as expected while deployed in testing environment 160b, user 110b (or another user associated with testing environment 160b) may modify label 172a to indicate that software package 180 is "Ready for Production." The updated label 172a and associated artifacts 174a comprising software package 180 may be stored by computer system 120 in data repository 170. Data repository 170 may store information relating to the version number of software package 180. According to the build schedule 152a associated with updated label 172a, computer system 120 may, at the appropriate interval, build software package 180 using the artifacts 174a associated with updated label 172a. Software package 180 may then be deployed to the software environment 160 corresponding to modified label 172a, for instance production environment 160c. Alternatively, a user 110c associated with the production environment 160c may instruct computer system 120 to build and deploy software package 180 to production environment 160c. Upon deployment, a user 110c associated with the production environment 160c may determine that software package 180 is ready to be implemented by enterprise 105.

FIG. 3 illustrates one embodiment of a method 300 for building software packages and deploying them to various software environments using system 100. Method 300 may be implemented, for example, by one or more computer programs 150 in computer system 120. Method 300 begins in step 310 where a particular build schedule from one or more build schedules is accessed. In certain embodiments, the build schedules may be build schedules 152 described above. In some embodiments, the build schedules are associated with one of a plurality of software environments such as software environments 160. In some embodiments, the build schedules are associated with one of a plurality of projects.

In step 320, one or more artifacts and a label associated with the one or more artifacts are accessed. In some embodiments, the one or more artifacts and a label associated with the one or more artifacts of step 320 may be artifacts 174 and label 172 described above. In some embodiments, the artifacts may be accessed by computer system 120. In certain embodiments, the artifacts may be generated by an ETL platform such as ETL 165 described above. The one or more artifacts may be individual software components. In some embodiments, the label associated with the one or more artifacts may correspond to a particular software environment, for example the one or more software environments 160 described above.

In step 330, the one or more artifacts and the label accessed in step 320 are used to build a software package. In certain embodiments, the processor 122 operating on computer system 120 may build the software package as described above. In some embodiments, the software package may be software package 180 described above. In some embodiments, components other than the artifacts and the label of step 320 may be included in the software package. As an example, and not by way of limitation, an executable file may also be incorporated into the software package.

In step 340, build-in verification on any code-conflict may be performed. Step 340 is optional, and may be included in some embodiments and absent from other embodiments. If a code conflict is discovered, then the method proceeds to step 350, and the build for the software package is aborted. If no code conflict exists, or if the particular embodiment of system 100 does not perform build-in verification on any code conflict, the method proceeds to step 360.

In step 360, the software package built in step 330 is deployed to the software environment corresponding to the label associated with the one or more artifacts. In some embodiments, the software environment may be the software environments 160 described above. In certain embodiments, the software environments may serve specific purposes. As an example, and not by way of limitation, the plurality of software environments may include a development environment, a testing environment, and a production environment, similar to software environments 160a-c described above.

In some embodiments, step 360 may also include performing backup on each deployment in one or more of the software environments 160, one or more of the data repositories 170, and one or more of the computer systems 120, so that restoration can be done if required.

Although not shown in FIG. 3, method 300 may optionally include the step of generating build summary reports. In certain embodiments, build summary reports may contain information about system 100 or one or more of the plurality of build schedules 152 described above. As an example, and not by way of limitation, build summary reports may include information relating to artifacts used in the build or the status of deployment in each of the build's current software environments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, capable, configured, enabled, operable, or operative.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
a memory operable to store one or more build schedules; and
a processor communicatively coupled to the memory and operable to:
 access a particular one of the one or more build schedules;
 access, from one or more data repositories according to the particular build schedule, one or more artifacts generated by an extract, transform, and load (ETL) platform and a label associated with the one or more artifacts, the label corresponding to a particular software environment selected from a plurality of software environments comprising:
  a development environment;
  a testing environment; and
  a production environment;
 build, using the one or more artifacts, a software package; and
 deploy the software package to the software environment corresponding to the label of the one or more artifacts;
wherein the one or more artifacts comprise one or more software components associated with a particular functionality to be added to the software package, and
wherein the particular build schedule:
 defines an interval with which the processor builds the software package; and
 comprises information associated with an adjustable frequency with which the processor accesses the one or more artifacts and the one or more labels associated with the one or more artifacts.

2. The system of claim 1, wherein the one or more data repositories further comprise version control functionality.

3. The system of claim 1, wherein each of the one or more build schedules are associated with one of the plurality of software environments.

4. The system of claim 1, wherein each of the one or more build schedules are associated with one of a plurality of projects.

5. The system of claim 1, wherein the build and deploy operations are automated.

6. The system of claim 1, wherein the processor is further operable to perform build-in verification on any code conflict.

7. The system of claim 6, wherein when a code conflict exists, the building of the software package is aborted and the artifacts and labels are returned to the data repository.

8. The system of claim 1, wherein the processor is further operable to generate a summary report based at least in part on the one or more artifacts of the software package, the summary report comprising a status of deployment in the particular software environment.

9. The system of claim 1, wherein the processor is further operable to backup data in connection with deploying the software package to the software environment corresponding to the label of the one or more artifacts.

10. The system of claim 1, wherein the software package includes an executable file.

11. The system of claim 1, wherein:
each of the one or more build schedules are associated with one of the plurality of software environments; and
each of the one or more build schedules are associated with one of a plurality of projects.

12. A method comprising:
accessing, by one or more computer systems, a particular build schedule from one or more build schedules;
accessing, by the one or more computer systems according to the particular build schedule, one or more artifacts and a label associated with the one or more artifacts, the label corresponding to a particular software environment; wherein the one or more artifacts are generated by an extract, transform, and load (ETL) platform, and the particular software environment is selected from a plurality of software environments comprising:
a development environment;
a testing environment; and
a production environment;
building, by the one or more computer systems using the one or more artifacts, a software package, the artifacts comprising one or more software components associated with a particular functionality to be added to the software package; and
deploying, by the one or more computer systems, the software package to the software environment corresponding to the label of the one or more artifacts, wherein the particular build schedule:
defines an interval with which the one or more computer systems builds the software package; and
comprises information associated with an adjustable frequency with which the processor accesses the one or more artifacts and the one or more labels associated with the one or more artifacts.

13. The method of claim 12, wherein the one or more artifacts and the label associated with the one or more artifacts are stored in one or more data repositories.

14. The method of claim 12, further comprising performing, by the one or more computer systems, build-in verification on any code conflict.

15. The method of claim 12, further comprising backing up, by the one or more computer systems, data in connection with deploying the software package to the software environment corresponding to the label associated with the one or more artifacts.

16. One or more computer-readable non-transitory storage media embodying software that is operable when executed by one or more computer systems to:
access a particular build schedule from one or more build schedules;
access, according to the particular build schedule, one or more artifacts and a label associated with the one or more artifacts, the label corresponding to a particular software environment; wherein the one or more artifacts are generated by an extract, transform, and load (ETL) platform, and the particular software environment is selected from a plurality of software environments comprising:
a development environment;
a testing environment; and
a production environment;
build, using the one or more artifacts, a software package; and
deploy the software package to the software environment corresponding to the label associated with the one or more artifacts;
wherein the one or more artifacts comprise one or more software components associated with a particular functionality to be added to the software package, and wherein the particular build schedule:
defines an interval with which the one or more computer systems builds the software package; and
comprises information associated with an adjustable frequency with which the processor accesses the one or more artifacts and the one or more labels associated with the one or more artifacts.

17. The media of claim 16, wherein the one or more artifacts and the label associated with the one or more artifacts are stored in one or more data repositories.

18. The media of claim 16, further operable to perform build-in verification on any code conflict.

* * * * *